(12) United States Patent
Makise et al.

(10) Patent No.: US 8,579,365 B2
(45) Date of Patent: Nov. 12, 2013

(54) COWL LOUVER SUPPORT STRUCTURE FOR AUTOMOBILE

(75) Inventors: Seiichiro Makise, Aichi (JP); You Kamitamari, Aichi (JP); Itaru Onishi, Aichi (JP)

(73) Assignee: Toyota Shatai Kabushiki Kaisha, Aichi-ken (JP)

( * ) Notice: Subject to any disclaimer, the term of this patent is extended or adjusted under 35 U.S.C. 154(b) by 36 days.

(21) Appl. No.: 13/319,946

(22) PCT Filed: Dec. 25, 2009

(86) PCT No.: PCT/JP2009/071528
§ 371 (c)(1),
(2), (4) Date: Jan. 19, 2012

(87) PCT Pub. No.: WO2010/150426
PCT Pub. Date: Dec. 29, 2010

(65) Prior Publication Data
US 2012/0175913 A1    Jul. 12, 2012

(30) Foreign Application Priority Data
Jun. 25, 2009   (JP) .................................. 2009-150946

(51) Int. Cl.
*B60R 13/07*   (2006.01)

(52) U.S. Cl.
USPC ........................................................... 296/192

(58) Field of Classification Search
USPC ........................................................... 296/192
See application file for complete search history.

(56) References Cited

FOREIGN PATENT DOCUMENTS

| JP | 3-43078 | 9/1991 |
|----|---------|--------|
| JP | 7-10037 | 1/1995 |
| JP | 2003-127661 | 5/2003 |
| JP | 2003-252045 | 9/2003 |
| JP | 2006-327486 | 12/2006 |
| JP | 2007-030834 | 2/2007 |

*Primary Examiner* — H Gutman
(74) *Attorney, Agent, or Firm* — Christensen Fonder P.A.

(57) ABSTRACT

In an automotive cowl louver support structure, vehicle-widthwise both sides of a cowl louver disposed between a windshield and a hood can be supported by lower portions of right and left rain gutters, and ornamental surfaces of the rain gutters can be continuous with a ornamental surface of the cowl louver. Engaged portions are provided to lower portions of the right and left rain gutters. Engagement portions configured to engage the respective engaged portions are provided to vehicle-widthwise both sides of the cowl louver. Further, the engagement portions of the cowl louver are engaged with the engaged portions of the right and left rain gutters.

2 Claims, 6 Drawing Sheets ified # COWL LOUVER SUPPORT STRUCTURE FOR AUTOMOBILE

PRIORITY CLAIM

The present application is a National Phase entry of PCT Application No. PCT/JP2010/071528, filed Dec. 25, 2009, which claims priority from Japanese Patent Application Number 2009-150946, filed Jun. 25, 2009, the disclosures of which are hereby incorporated by reference herein in their entirety.

TECHNICAL FIELD

The present invention relates to an automotive cowl louver support structure having right and left rain gutters that are attached to right and left front pillars supporting vehicle-widthwise both sides of a windshield so as to extend therealong and that allow rainwater to flow down along the front pillars, in which vehicle-widthwise both sides of a cowl louver disposed between the windshield and a hood can be supported by lower portions of the right and left rain gutters and in which ornamental surfaces of the rain gutters can be continuous with a ornamental surface of the cowl louver.

BACKGROUND ART

A technique related to an automotive cowl louver support structure is described in Japanese Laid-Open Patent Publication No. 7-10037.

In the cowl louver support structure described in Patent Document 1, a cowl louver is attached to a cowl panel of a body by a plurality of clips.

However, as shown in, for example, FIG. 1, in an automobile provided with rain gutters 102 that allow rainwater on a windshield G to flow down along front pillars 101, it is common practice that vehicle-widthwise both ends of a cowl louver 104 are supported by lower portions of the right and left rain gutters 102.

That is, as shown in FIG. 6(A), the lower portions of the rain gutters 102 capable of supporting the cowl louver 104 are provided with support plates 103 that project inwardly in a vehicle-widthwise direction. The support plates 103 have substantially V-shaped notches 103c that are formed in front end edges thereof.

Further, as shown in FIG. 6(B), hook portions 106 are formed in the vehicle-widthwise both ends of the cowl louver 104. The hook portions 106 project downwardly from back side of the cowl louver 104 and are bent backwardly so as to have a substantially J-shape in side view. Further, when a back end edge upper portion 104f of the cowl louver 104 is disposed on a lower end periphery of the windshield G, the hook portions 106 of the cowl louver 104 are hooked on the notches 103c of the support plates 103 from before and below, so that vehicle-widthwise both sides of the cowl louver 104 can be connected to the lower portions of the right and left rain gutters 102. Further, in this condition, ornamental surfaces 102e of the rain gutters 102 and a ornamental surface 104e of the cowl louver 104 can be continuous with each other.

SUMMARY OF THE INVENTION

Problem to be Solved by the Invention

In the above-described cowl-louver support structure, the hook portions 106 of the cowl louver 104 are hooked on the notches 103c of the support plates 103 of the rain gutters 102 from below, so that both members 104 and 102 can be connected to each other (FIG. 6(B)). Therefore, for example, when a downward force is applied to the cowl louver 104, the support plates 103 of the rain gutters 102 cannot support the hook portions 106 of the cowl louver 104, so that the cowl louver 104 can be displaced downwardly. As a result, steps can be formed in boundary positions K between the ornamental surfaces 102e of the rain gutters 102 and the ornamental surface 104e of the cowl louver 104. This may lead to inferior appearance thereof.

Further, the cowl louver 104 and the rain gutters 102 can be engaged with each other at one position via the hook portions 106 and the support plates 103. Therefore, the cowl louver 104 is likely to be allowed to rotate horizontally with respect to the rain gutters 102. As a result, gaps each of which the width is changed longitudinally can be formed in the boundary positions K between the ornamental surfaces 102e of the rain gutters 102 and the ornamental surface 104e of the cowl louver 104. This may lead to inferior appearance thereof.

Thus, there is a need in the art to provide an improved automotive cowl louver support structure.

SUMMARY OF THE INVENTION

A first aspect of the present invention provides an automotive cowl louver support structure having right and left rain gutters that are attached to right and left front pillars supporting vehicle-widthwise both sides of a windshield so as to extend therealong and that allow rainwater to flow down along the front pillars, in which vehicle-widthwise both sides of a cowl louver disposed between the windshield and a hood can be supported by lower portions of the right and left rain gutters and in which ornamental surfaces of the rain gutters can be continuous with a ornamental surface of the cowl louver. Engaged portions are provided to lower portions of the right and left rain gutters. Engagement portions configured to engage the respective engaged portions of the rain gutters are provided to vehicle-widthwise both sides of the cowl louver. When the cowl louver is set between the right and left rain gutters from a given direction, the engagement portions of the cowl louver are engaged with the engaged portions of the right and left rain gutters, so that the cowl louver can be prohibited from moving vertically and rotating horizontally relative to the right and left rain gutters.

According to the present invention, because the engagement portions of the cowl louver are engaged with the engaged portions of the rain gutters, the cowl louver can be prevented from moving vertically with respect to the rain gutters. As a result, for example, if an upward or downward force is applied to the cowl louver, the cowl louver can be avoided from being displaced upwardly or downwardly with respect to the rain gutters. Therefore, any steps (differences in height) cannot be formed in boundary positions between the ornamental surfaces of the rain gutters and the ornamental surface of the cowl louver.

Further, because the engagement portions of the cowl louver are engaged with the engaged portions of the rain gutters, the cowl louver can be prohibited from rotating horizontally with respect to the rain gutters. As a result, for example, if a horizontally rotational force is applied to the cowl louver, the cowl louver can be prevented from being horizontally rotationally displaced with respect to the rain gutters. Therefore, any unstable gaps each of which the width is changed longitudinally cannot be formed in the boundary positions between the ornamental surfaces of the rain gutters and the ornamental surface of the cowl louver.

Thus, a portion around the cowl louver and the rain gutter can have increased appearance.

In the second aspect of the present invention, each of the engaged portions of the right and left rain gutters has a first receiving portion on which a first claw portion of each of the engagement portions of the cowl louver is hooked and a second receiving portion on which a second claw portion of each of the engagement portions of the cowl louver is hooked. The first and second receiving portions are positioned spaced away from each other in a back and forth direction.

That is, a plurality of claw portions and a plurality of receiving portions that are respectively formed spaced away from each other are engaged with each other while the engagement portions of the cowl louver and the engaged portions of the rain gutters are engaged with each other. Therefore, the cowl louver can be effectively prevented from being horizontally rotationally displaced.

In the third aspect of the present invention, each of the engaged portions of the right and left rain gutters is formed to have a groove shape that extends in the back and forth direction. Each of the engagement portions of the cowl louver is formed to have a ridge shape that extends in the back and forth direction. Each of the engagement portions is constructed to engage each of the groove-shaped engaged portions of the rain gutters from before. Each of the groove-shaped engaged portions of the right and left rain gutters is shaped such that a width thereof can be increased forwardly and reduced backwardly.

In this way, each of the groove-shaped engaged portions of the rain gutters is shaped such that the width thereof can be increased forwardly. Therefore, the engagement portions of the cowl louver can be easily engaged with the engaged portions from before. Further, each of the engaged portions of the rain gutters is shaped such that the width thereof can be reduced backwardly. Therefore, in the process in which the engagement portions of the cowl louver are engaged with the engaged portions from before, the cowl louver can be positioned on a desired position with respect to the rain gutters.

According to the present invention, any steps (differences in height) and unstable gaps cannot be formed in the boundary positions between the ornamental surface of the cowl louver and the ornamental surfaces of the rain gutters. As a result, appearance of the cowl louver and the rain gutters can be prevented from being deteriorated.

DETAILED DESCRIPTION OF THE INVENTION

[Embodiment 1]

Figure 1:
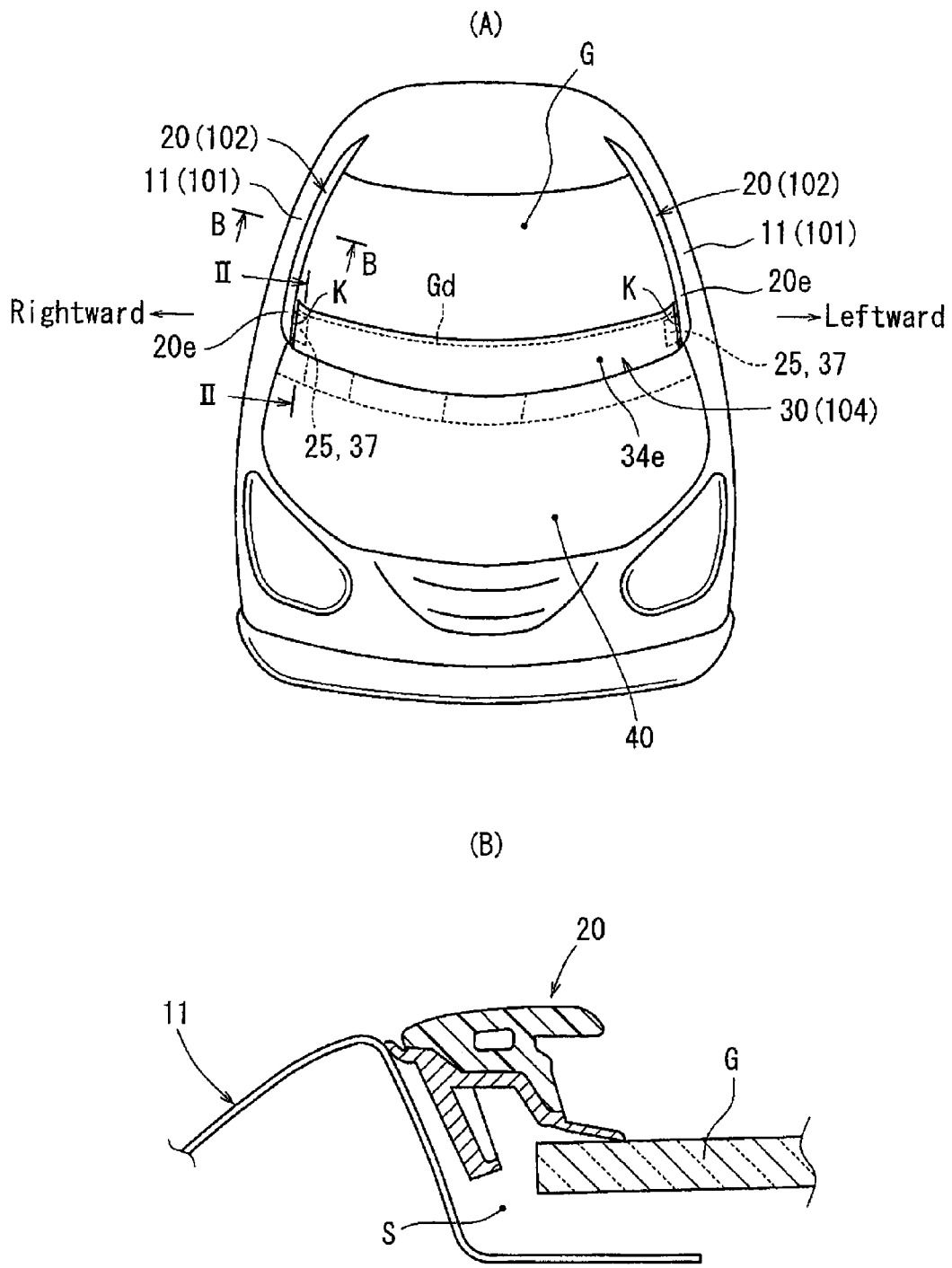
FIG. 1(A) is a schematic front view of an automobile having a cowl louver support structure according to Embodiment 1 of the present invention.
FIG. 1(B) is a cross-sectional view taken along line B-B of FIG. 1(A)

An automotive cowl louver support structure according to Embodiment 1 of the present invention will be hereinafter described with reference to FIGS. (A) to 5(B).

Further, forward and backward, rightward and leftward, and upward and downward in the drawings respectively correspond to forward and backward, rightward and leftward, and upward and downward of an automobile.

<Regarding Outline of the Automotive Cowl Louver Support Structure>

As shown in FIG. 1(A), rain gutters 20 are attached to right and left front pillars 11 supporting vehicle-widthwise both sides of a windshield G of the automobile so as to extend along the front pillars 11. As shown in FIG. 1(B), the rain gutters 20 are positioned so as to cover gaps S between the front pillars 11 and the windshield G, so that rainwater can flow down along the front pillars 11.

Further, a cowl louver 30 is disposed between the windshield G and an engine hood 40. Vehicle-widthwise both sides of the cowl louver 30 are supported by lower portions of the right and left rain gutters 20, which will be hereinafter described. Further, in this condition, ornamental surfaces 20e of the rain gutters 20 can be continuous with a ornamental surface 34e of the cowl louver 30.

<Regarding the Cowl Louver 30>

Figure 2:
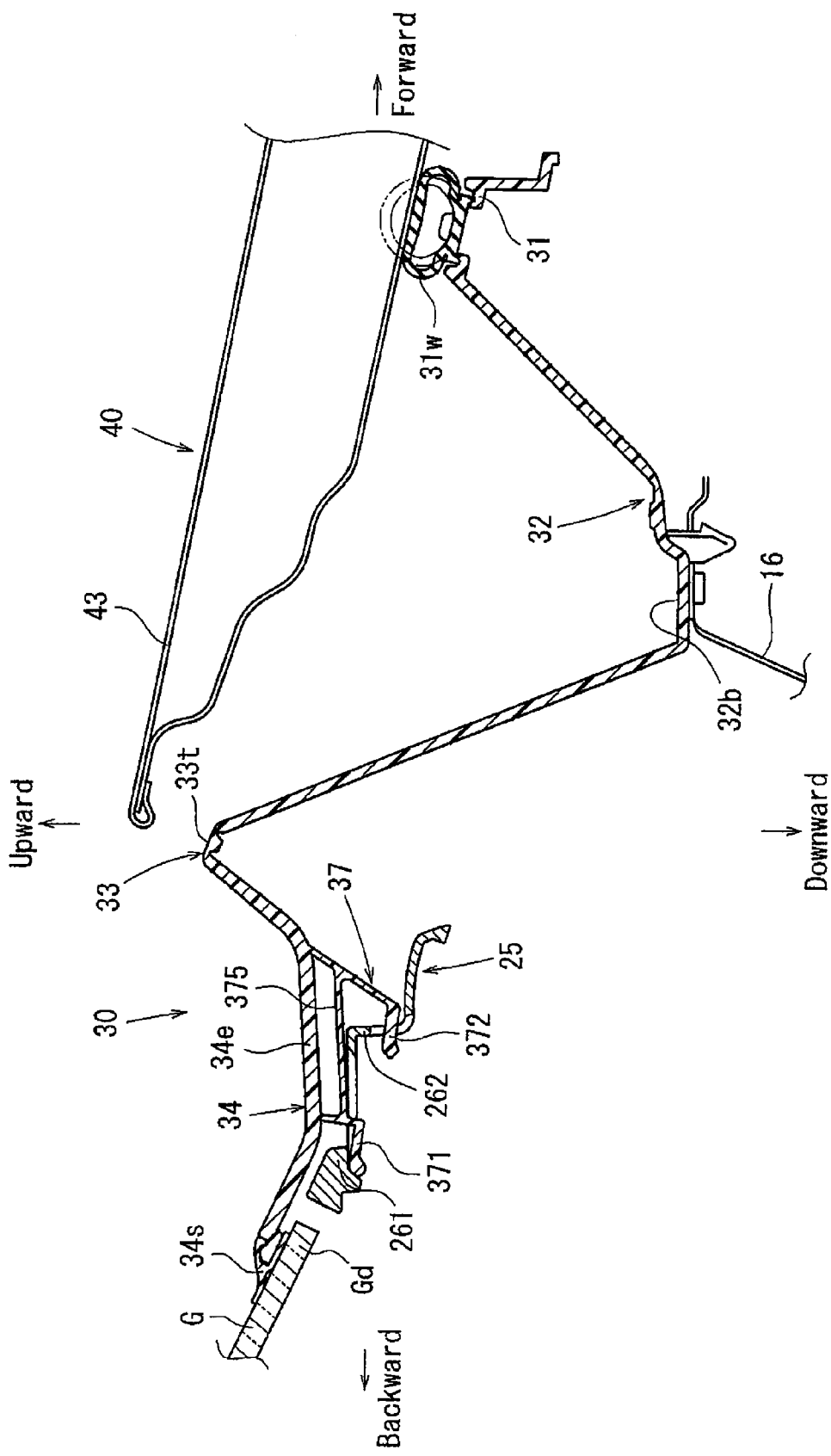
FIG. 2 is a cross-sectional view taken along line II-II of FIG. 1.
Figure 3:
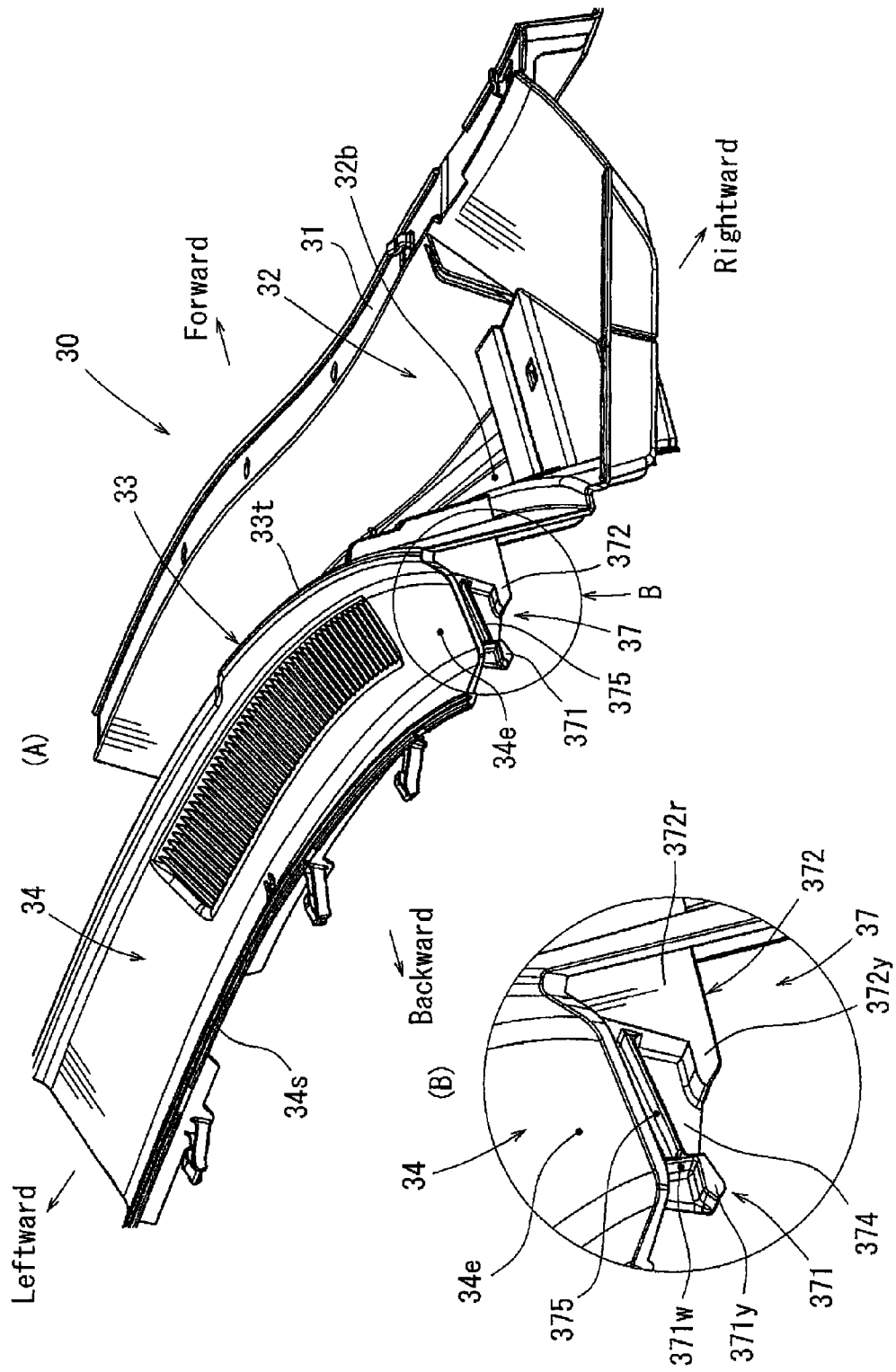
FIG. 3(A) is a perspective view of a cowl louver used in the cowl louver support structure according to the present embodiment.
FIG. 3(B) is an enlarged view of a portion indicated by arrow B of FIG. 3(A)

As shown in FIGS. 2 and 3(A), the cowl louver 30 has a first ridge portion 31, a groove portion 32, a second ridge portion 33 and a ornamental portion 34, which are positioned sequentially from before backward side. The first ridge portion 31, the groove portion 32, the second ridge portion 33 and the ornamental portion 34 are respectively shaped to extend in a vehicle widthwise direction. Further, a bottom portion 32b of the groove portion 32 of the cowl louver 30 is supported by a cowl panel 16 (FIG. 2) from below. Further, as shown in FIG. 2, a section defined between the first ridge portion 31 positioned at a forward end of the cowl louver 30 and an apex portion 33t of the second ridge portion 33 can be covered by a back end periphery 43 of the engine hood 40. Further, a weather strip 31w is positioned on and attached to the first ridge portion 31 of the cowl louver 30 while extending along an apex portion of the first ridge portion 31, so as to seal a space between the engine hood 40 and the cowl louver 30 thereby.

The ornamental portion 34 of the cowl louver 30 is a portion visible externally and has a seal member 34s that is attached to a the back end periphery of the ornamental portion 34. As shown in FIG. 2, a lower end periphery Gd of the windshield G is covered by the seal member 34s over the entire width in the vehicle widthwise direction. A surface 34e of the ornamental portion 34 corresponds to an ornamental surface of the present invention. Therefore, the surface 34e of the ornamental portion 34 may be hereinafter referred to as the ornamental surface 34e.

As shown in FIGS. 3(A) and 3(B), the cowl louver 30 has engagement portions 37 that are formed in vehicle-widthwise both sides (right and left ends) of the ornamental portion 34. The engagement portions 37 are constructed to be engaged with engaged portions 25 (which will be herein after described) of the rain gutters 20, so that vehicle-widthwise both sides of the ornamental portion 34 of the cowl louver 30 can be connected to the lower portions of the right and left rain gutters 20 when the portions 37 and 25 are engaged with each other.

The right and left engagement portions 37 of the cowl louver 30 are formed symmetrically in the vehicle widthwise direction. Therefore, a structure of the right engagement portion 37 will be described with reference to FIG. 3(B) as a representative of the engagement portions 37.

The engagement portion 37 has a plate portion 374. The plate portion 374 projects downwardly from a back surface of the ornamental portion 34 and extends in a back and forth direction. The plate portion 374 has a first claw portion 371, a second claw portion 372 and a connection plate portion 375 that are formed in a right side surface thereof.

The first claw portion 371 of the engagement portion 37 has a vertical plate portion 371$w$ and a deck portion 371$y$ that is projected backwardly from a lower end of the vertical plate portion 371$w$, so as to have a reverse-L-shape. The first claw portion 371 thus shaped is formed in a back end upper portion of the plate portion 374. The second claw portion 372 of the engagement portion 37 is constructed of a chevron-shaped rib portion 372$r$ and a deck portion 372$y$ that is projected backwardly from a lower end of the rib portion 372$r$. The second claw portion 372 thus shaped is formed in a front side lower portion of the plate portion 374. Further, the connection plate portion 375 is formed to be substantially parallel to the back surface of the ornamental portion 34 while connecting a front surface lower portion of the vertical plate portion 371$w$ of the first claw portion 371 and a back surface upper portion of the rib portion 372$r$ of the second claw portion 372.

Horizontally (rightwardly) projecting dimensions of the first claw portion 371, the second claw portion 372 and the connection plate portion 375 relative to the plate portion 374 are set to be equal to each other, so that the engagement portion 37 can be formed to have a ridge shape.

<Regarding the Engaged Portions 25 of the Rain Gutters 20>

As shown in, for example, FIG. 1(A), the lower portions of the rain gutters 20 are formed to project downwardly beyond the lower end periphery Gd of the windshield G. Further, as shown in, for example, FIG. 4(A), the engaged portion 25 is formed in a lower left side surface of the right rain gutter 20. Further, the engaged portion 25 is formed in a lower right side surface of the left rain gutter 20 (FIG. 1(A)). Further, the engaged portions 25 of the right and left rain gutters 20 are formed symmetrically in the vehicle widthwise direction. Therefore, a structure of the right engaged portion 25 will be described with reference to FIGS. 4(A) to 4(C) as a representative of the engaged portions 25.

The engaged portion 25 has an inner vertical wall portion 251 that constitutes the lower left side surface of the rain gutter 20, and an outer vertical wall portion 253 that is positioned substantially opposite to the inner vertical wall portion 251. The two vertical wall portions 251 and 253 are formed so as to be higher in front portions thereof and lower in back portions thereof. Further, back end portions of the inner vertical wall portion 251 and the outer vertical wall portion 253 of the engaged portion 25 are connected to each other by a back beam portion 254. Also, front lower ends of the vertical wall portions 251 and 253 are connected to each other by a bottom plate portion 255. That is, a front portion of the engaged portion 25 is defined by the inner vertical wall portion 251, the outer vertical wall portion 253 and the bottom plate portion 255 and is formed to have a substantially U-shaped groove shape.

Further, the engaged portion 25 has an opening 256 that is formed between the inner vertical wall portion 251 and the outer vertical wall portion 253 thereof, so as to extend from the bottom plate portion 255 to the back beam portion 254. Further, the inner vertical wall portion 251 has a first receiving portion 261 and a second receiving portion 262 that are projected laterally into the opening 256.

The first receiving portion 261 is formed as a portion on which the first claw portion 371 of the engagement portion 37 of the cowl louver 30 is hooked from before and below. A rear end periphery of the first receiving portion 261 is connected to the back beam portion 254. That is, the first receiving portion 261 is positioned on a rear end position of the opening 256.

Figure 4:
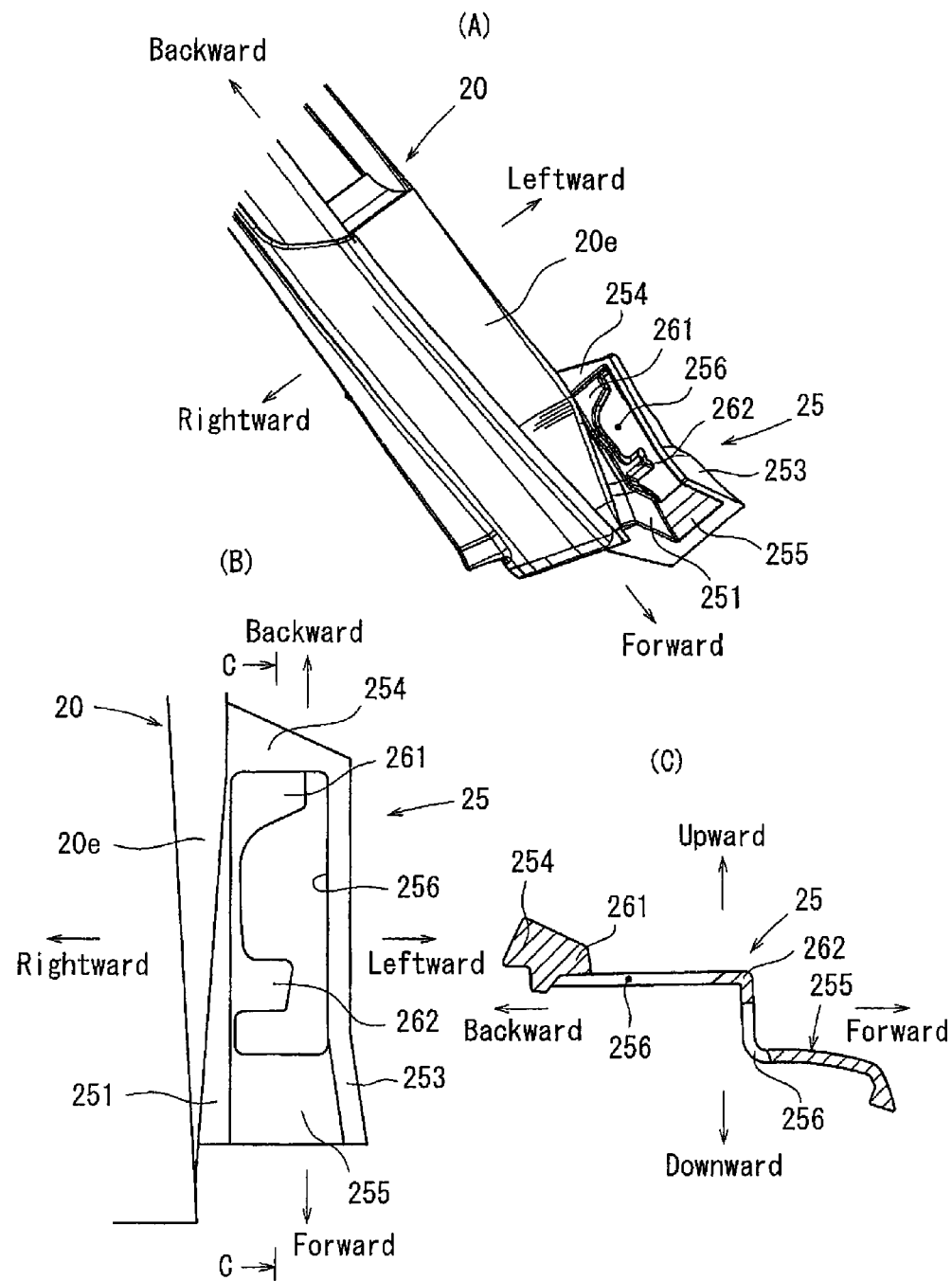
FIG. 4(A) is a perspective view of a lower portion of a rain gutter used in the cowl louver support structure according to the present embodiment.
FIG. 4(B) is a plan view of an engaged portion of the rain gutter.
FIG. 4(C) is a sectional view taken along line C-C of FIG. 4(B)

The second receiving portion 262 is formed as a portion on which the second claw portion 372 of the engagement portion 37 of the cowl louver 30 is hooked from before and below and which supports the connection plate portion 375 from below. As shown in FIG. 4(C), the second receiving portion 262 is positioned on a the front end position of the opening 256 so as to have the substantially same height as the first receiving portion 261.

As shown in FIG. 4(B), a distance between the inner vertical wall portion 251 and the outer vertical wall portion 253 of the engaged portion 25 is set to be increased toward a front end of the engaged portion 25 at a position of the bottom plate portion 255. That is, the distance is set to be minimized at a position adjacent to the opening 256. Further, the distance between the inner vertical wall portion 251 and the outer vertical wall portion 253 of the engaged portion 25 at the position adjacent to the opening 256 is set to be substantially equal to a width of the engagement portion 37 of the cowl louver 30. Further, a distance between distal ends (left ends) of the first receiving portion 261 and the second receiving portion 262 and the outer vertical wall portion 253 is set such that the plate portion 374 of the engagement portion 37 of the cowl louver 30 can be inserted therebetween (FIG. 5(A)).

<Regarding Attaching Operation of the Cowl Louver 30>

An attaching operation of the cowl louver 30 is performed after an attaching operation of the right and left rain gutters 20 is completed.

That is, in a condition in which the right and left rain gutters 20 are attached, the engagement portions 37 that are formed in the vehicle-widthwise both sides (right and left sides) of the cowl louver 30 are engaged with the engaged portions 25 of the right and left rain gutters 20 from before. As previously described, the distance between the inner vertical wall portion 251 and the outer vertical wall portion 253 of the engaged portion 25 of each of the rain gutters 20 is set to be increased toward the front end of the engaged portion 25 at the position of the bottom plate portion 255, which is shown in, for example, FIG. 4(B). Therefore, each of the right and left engagement portions 37 of the cowl louver 30 can be guided by the inner vertical wall portion 251 and the outer vertical wall portion 253 of the engaged portion 25 of each of the rain gutters 20. Thus, the engagement portions 37 can be easily fit-engaged with the engaged portions 25.

Figure 5:
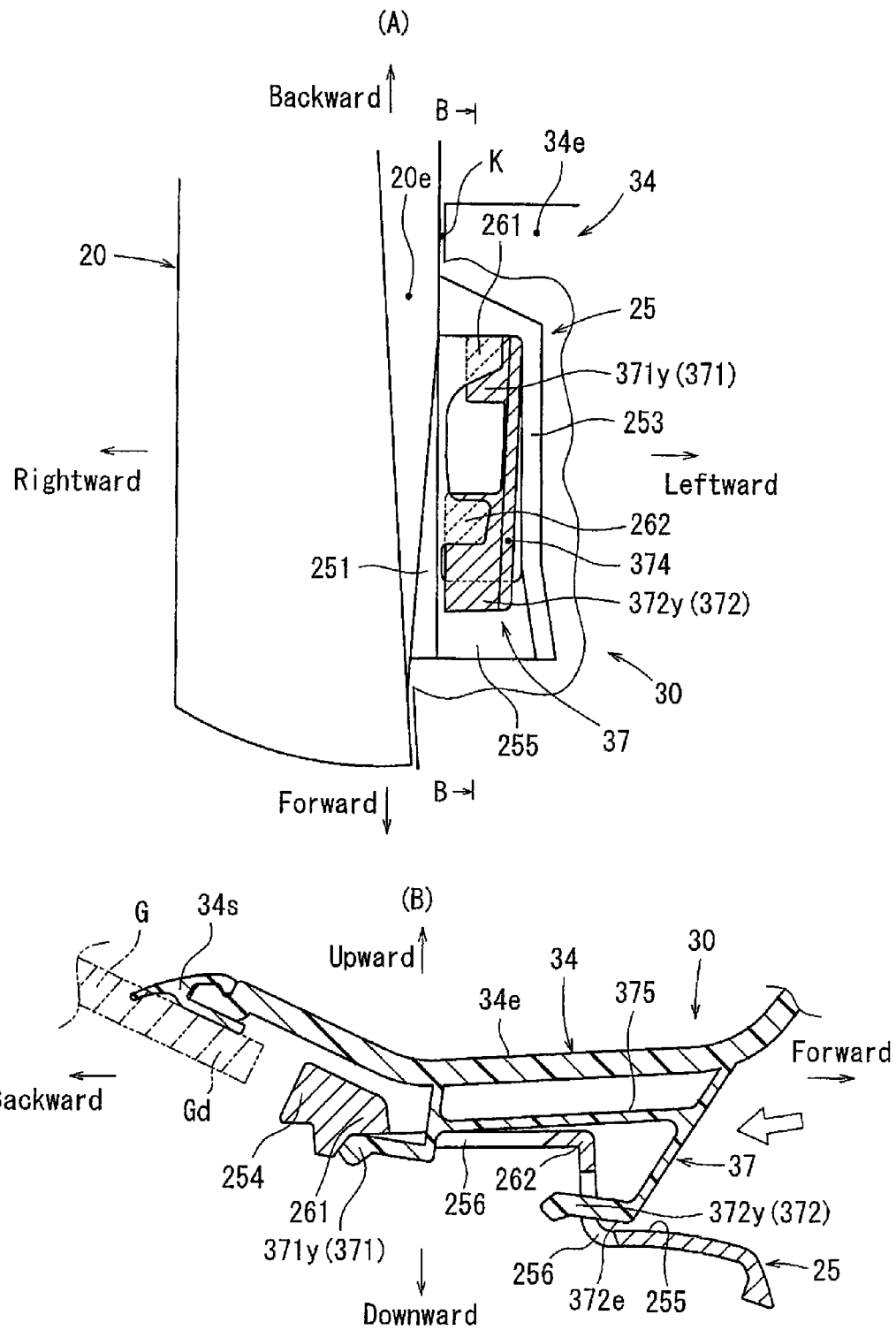
FIG. 5(A) is a plan view, which illustrate how an engagement portion of the cowl louver and the engaged portion of the rain gutter are engaged with each other.
FIG. 5(B) is a cross-sectional view taken along line B-B of FIG. 5(A)
Figure 6:
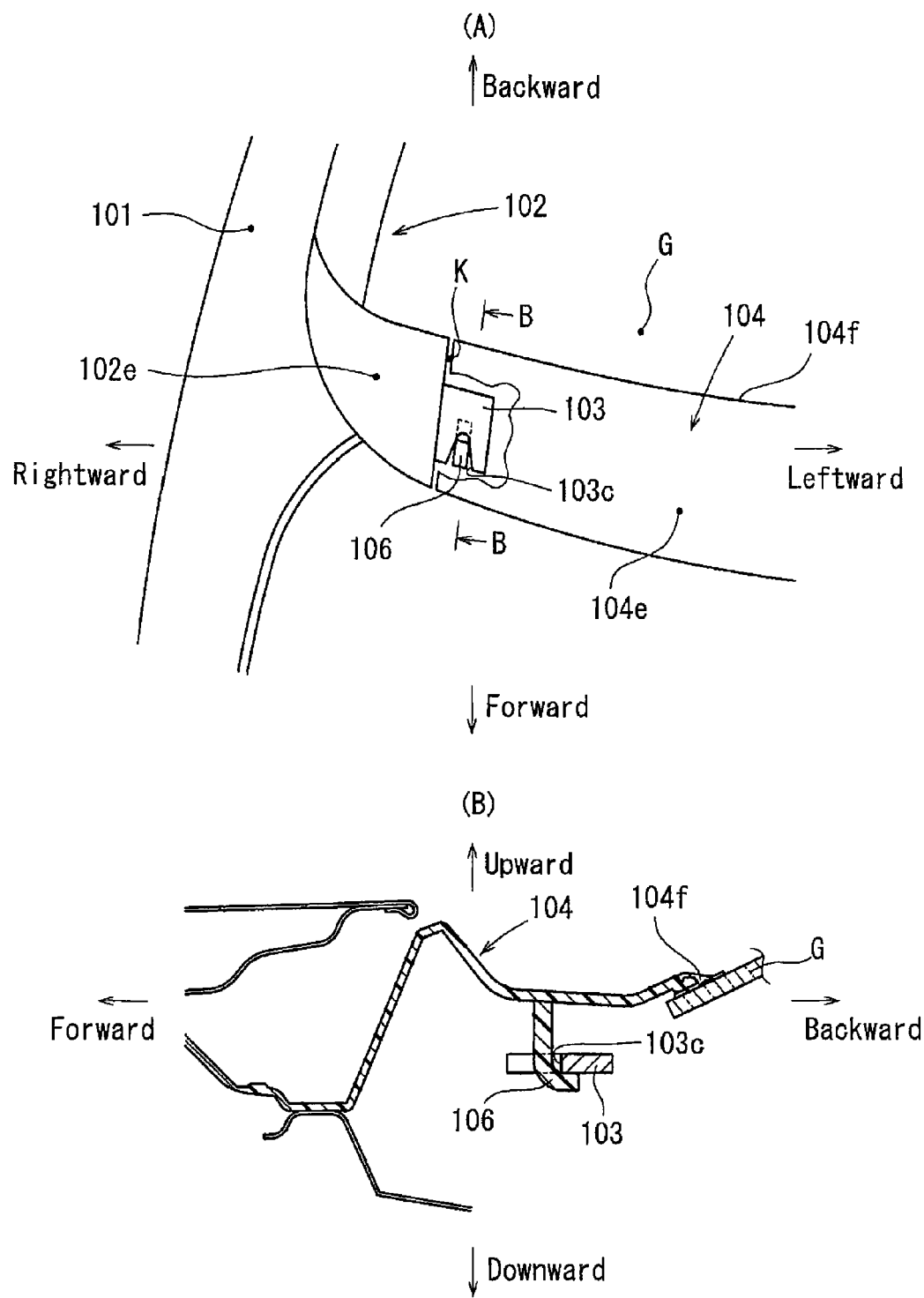
FIG. 6(A) is a schematic plan view of a conventional cowl louver support structure.
FIG. 6(B) is a sectional view taken along line B-B of FIG. 6(A).

Further, as shown in FIGS. 5(A) and 5(B), in a process in which the right and left engagement portions 37 of the cowl louver 30 are pressed into the engaged portions 25 of the rain gutters 20 from before, the first claw portions 371 of the engagement portions 37 of the cowl louver 30 can be inserted into the openings 256 of the engaged portions 25 of the rain gutters 20, so as to be hooked on the first receiving portions 261 from before and below. Similarly, the second claw portions 372 of the engagement portions 37 of the cowl louver 30 can be inserted into the openings 256 of the engaged portions 25 of the rain gutters 20, so as to be hooked on the second receiving portions 262 from before and below. Further, the connection plate portions 375 of the engagement portions 37 of the cowl louver 30 can be supported from below by the second receiving portions 262 of the engaged portions 25 of the rain gutters 20. Further, as shown in FIG. 5(B), lower end surfaces 372e of the second claw portions 372 of the engagement portions 37 can be supported from below by the bottom plate portions 255 of the engaged portions 25 of the rain gutters 20.

Further, the engagement portions 37 of the cowl louver 30 are pressed into the engaged portions 25 of the rain gutters 20 from before, so that the engagement portions 37 of the cowl louver 30 can be laterally constrained by the inner vertical wall portions 251 and the outer vertical wall portions 253 of the rain gutters 20.

That is, the engagement portions 37 of the cowl louver 30 are engaged with the engaged portions 25 of the rain gutters 20, so that the cowl louver 30 can be prohibited from moving vertically and rotating horizontally relative to the rain gutters 20.

Further, the engagement portions 37 of the cowl louver 30 are engaged with the engaged portions 25 of the rain gutters 20, so that the ornamental surfaces 20e of the rain gutters 20 and the ornamental surface 34e of the cowl louver 30 can be continuous with each other.

<Advantage of the Cowl Louver Support Structure According to the Present Embodiment>

According to the cowl louver support structure according to the present embodiment, because the engagement portions 37 of the cowl louver 30 are engaged with the engaged portions 25 of the rain gutters 20, the cowl louver 30 can be prevented from moving vertically with respect to the rain gutters 20. As a result, for example, if an upward or downward force is applied to the cowl louver 30, the cowl louver 30 can be avoided from being displaced upwardly or downwardly with respect to the rain gutters 20. Therefore, any steps (differences in height) cannot be formed in boundary positions K between the ornamental surfaces 20e of the rain gutters 20 and the ornamental surface 34e of the cowl louver 30 (FIG. 5(A)).

Further, because the engagement portions 37 of the cowl louver 30 are engaged with the engaged portions 25 of the rain gutters 20, the cowl louver 30 can be prohibited from rotating horizontally with respect to the rain gutters 20. As a result, for example, if a horizontally rotational force is applied to the cowl louver 30, the cowl louver 30 can be prevented from being horizontally rotationally displaced with respect to the rain gutters 20. Therefore, any unstable gaps each of which the width is changed longitudinally cannot be formed in the boundary positions K between the ornamental surfaces 20e of the rain gutters 20 and the ornamental surface 34e of the cowl louver 30.

Thus, a portion around the cowl louver 30 and the rain gutter 20 can have increased appearance.

Further, each of the engaged portions 25 of the right and left rain gutters 20 has the first receiving portion 261 on which the first claw portion 371 of each of the engagement portions 37 of the cowl louver 30 is hooked, and the second receiving portion 262 on which the second claw portion 372 of each of the engagement portions 37 of the cowl louver 30 is hooked. The first and second receiving portions 261 and 262 are positioned spaced away from each other in the back and forth direction. That is, a plurality of claw portions 371 and 372 and a plurality of receiving portions 261 and 262 that are respectively formed spaced away from each other are engaged with each other while the engagement portions 37 of the cowl louver 30 and the engaged portions 25 of the rain gutters 20 are engaged with each other. Therefore, the cowl louver 30 can be effectively prevented from being horizontally rotationally displaced.

Further, each the groove-shaped engaged portions 25 of the right and left rain gutters 20 is shaped such that a width thereof can be increased forwardly. Therefore, the engagement portions 37 of the cowl louver 30 can be easily engaged with the engaged portions 25 from before. Further, each of the engaged portions 25 of the rain gutters 20 is shaped such that the width thereof can be reduced backwardly. Therefore, in the process in which the engagement portions 37 of the cowl louver 30 are engaged with the engaged portions 25 from before, the cowl louver 30 can be positioned on a desired position with respect to the rain gutters 20.

<Modified Forms>

Further, the present invention is not limited to the embodiment described above, and the embodiment can be easily changed or modified without departing from the gist of the present invention. For example, in the present embodiment, each of the engagement portions 37 of the cowl louver 30 is formed to have the ridge shape, and each of the engaged portions 25 of the rain gutters 20 is formed to have the groove shape. However, each of the engagement portions 37 of the cowl louver 30 can be formed to have a groove shape, and each of the engaged portions 25 of the rain gutters 20 can be formed to have a ridge shape.

Further, in the above example, each of the engagement portions 37 of the cowl louver 30 has the two front and back claw portions 371 and 372. Further, the engaged portion 25 of each of the rain gutters 20 has the two front and back receiving portions 261 and 262 on which the claw portions 371 and 372 are hooked. However, the number of the claw portions and the receiving portions can be appropriately changed as necessary.

The invention claimed is:

1. An automotive cowl louver support structure having right and left rain gutters that are attached to right and left front pillars supporting vehicle-widthwise both sides of a windshield so as to extend therealong and that allow rainwater to flow down along the front pillars, in which vehicle-widthwise both sides of a cowl louver disposed between the windshield and a hood can be supported by lower portions of the right and left rain gutters and in which ornamental surfaces of the rain gutters can be continuous with art ornamental surface of the cowl louver, wherein engaged portions are provided to lower portions of the right and left rain gutters, wherein engagement portions configured to engage the respective engaged portions of the rain gutters are provided vehicle-widthwise at both sides of the cowl louver, wherein when the cowl louver is set between the right and left rain gutters from a given direction, the engagement portions of the cowl louver are engaged with the engaged portions of the right and left rain gutters, so that the cowl louver can be prohibited from moving vertically and rotating horizontally relative to the right and left rain gutters, and wherein each of the engaged portions of the right and left rain gutters has a first receiving portion on which a first claw portion of each of the engagement portions of the cowl louver is hooked and a second receiving portion on which a second claw portion of each of the engagement portions of the cowl louver is hooked, in which the first and second receiving portions are positioned spaced apart from each other along a backward-forward direction, and wherein each of the engaged portions of the right and left rain gutters has an inner vertical wall portion and an outer vertical wall portion that are connected to each other by a back beam portion and a bottom plate portion, wherein each of the engaged portions has an opening formed between the inner vertical wall portion and the outer vertical wall portion, wherein the first and second receiving portions are projected from the inner vertical wall portion into the opening, wherein each of the engagement portions of cowl louver has a plate portion, and wherein the first claw portion and the second claw portion of each of the engagement portions are respectively formed in a back end upper portion and a front side lower portion of the plate portion.

2. The automotive cowl louver support structure defined in claim 1, wherein each of the engaged portions of the right and left rain gutters is formed to have a groove shape that extends in the backward-forward direction, wherein each of the engagement portions of the cowl louver is formed to have a ridge shape that extends in the backward-forward direction, further wherein each of the engagement portions is constructed to engage each of the groove-shaped engaged portions of the rain gutters, and wherein each of the groove-shaped engaged portions of the right and left rain gutters is shaped such that a width thereof can be increased in a forward direction and reduced in a backward direction.

* * * * *